United States Patent Office 3,491,054
Patented Jan. 20, 1970

3,491,054
METHODS FOR PREPARING ORGANO-POLY-
SILOXANES USING ALUMINUM HYDROLYSIS
CATALYSTS
Ian M. Thomas, Temperance, Mich., assignor to Owens-
Illinois, Inc., a corporation of Ohio
No Drawing. Continuation-in-part of application Ser. No.
652,723, July 12, 1967. This application Mar. 28, 1969,
Ser. No. 811,677
Int. Cl. C08g 31/36
U.S. Cl. 260—33.4                22 Claims

ABSTRACT OF THE DISCLOSURE

Methods for hydrolyzing trifunctional organic silanes such as methyltrialkoxysilane, phenyltrialkoxysilane, or mixtures thereof at neutral conditions using an aluminum-containing hydrolysis catalyst such as an aluminum chelate including aluminum triacetylacetonate or an aluminum alkoxide such as aluminum isopropoxide. The resultant heat curable, solvent-soluble prepolymer is used to prepare excellent laminates, moldings and hard, clear, flexible coatings.

CROSS REFERENCE TO RELATED APPLICATION

This application is a continuation-in-part application of copending application Ser. No. 652,723 filed July 12, 1967 now abandoned and assigned to the same assignee as that of the present invention.

The present invention relates to methods of hydrolyzing alkyl or aryl trialkoxysilanes at neutral conditions to provide organic solvent-soluble, further curable organopolysiloxane prepolymers and thermoset organopolysiloxanes prepared therefrom.

In the past, it has been difficult to hydrolyze and condense reproducibly organic trifunctional silanes such as methyltrialkoxysilanes by an acid-catalyzed hydrolysis. The amount of acid catalyst such as hydrochloric acid used must be carefully controlled and a slight deviation from an exact prescribed amount as a result of an inadvertent mistake or error can cause a large variation in the polymer produced thereby. The reactions of hydrolysis and condensation are quite fast and sensitive and they generally cannot be easily controlled.

Accordingly, it is an object of the present invention to provide reproducible and economical methods of controllably hydrolyzing organic trifunctional silane monomers such as methyltrialkoxysilane and phenyltrialkoxysilane employing neutral conditions and an aluminum-containing hydrolysis catalyst such as an aluminum chelate or alkoxide.

It is an object of the present invention to provide a method of controlling the hydrolysis of an alkyl or aryl trialkoxysilane by employing substantially neutral conditions and an aluminum chelate or alkoxide hydrolysis catalyst such as aluminum triacetylacetonate, di-isopropoxy aluminum monoacetylacetonate and aluminum isopropoxide.

It is an object of the present invention to provide a method of hydrolyzing an organic trialkoxysilane monomer such as methyltrialkoxysilane and preparing a solvent-soluble further curable organopolysiloxane prepolymer therefrom, the method including:
(A) Heating a mixture of—
  (1) an organic trialkoxysilane,
  (2) an effective amount of an aluminum chelate or alkoxide hydrolysis catalyst; and
  (3) at least about 1.5 moles of water for every mole of silane at a temperature of about 25° to 160° C. for about 1 to 10 hours to form an organopolysiloxane prepolymer; and
(B) Separating the prepolymer product of Step A from the reaction mixture to obtain a solvent-soluble further curable organopolysiloxane.

It is an object of the present invention to provide a method of hydrolyzing an organic trialkoxysilane monomer and ultimately preparing a thermoset organopolysiloxane from the hydrolyzed prepolymer product, the method including:
(A) Heating a mixture of—
  (1) a silane such as methyltrialkoxysilane, phenyltrialkoxysilane and mixtures thereof,
  (2) an aluminum chelate or alkoxide hydrolysis catalyst such as aluminum triacetylacetonate or isopropoxide in an amount equivalent to about 10 to 200 parts by weight of aluminum per million parts of silane and water, and
  (3) at least about 1.5 moles of water per mole of silane, at a temperature of preferably about 75 to 85° C. for at least about one hour to form an organopolysiloxane prepolymer product having a viscosity equivalent to that of preferably about 30 to 65 centipoises at 60% solids at 25° C. in ethanol, and
(B) Curing the product of Step A at about 90° to 300° C. or higher for at least about one minute to provide a hard, clear, acetone-resistant thermoset organopolysiloxane.

These and other objects will become apparent from the specification that follows and the appended claims.

The present invention provides a method of hydrolyzing an organic trialkoxysilane monomer and preparing a solvent-soluble further curable organopolysiloxane prepolymer therefrom, the method comprising the steps of:
(A) Heating a mixture of—
  (1) a silane which is selected from the group consisting of methyltrialkoxysilane, phenyltrialkoxysilane and mixtures thereof in which the alkoxy group contains 1 to 6 carbon atoms;
  (2) an effective catalytic amount of an aluminum chelate or alkoxide hydrolysis catalyst; and
  (3) at least about 1.5 moles of water for every mole of silane at a temperature of about 50° to 160° C. for about 1 to 10 hours to form an organopolysiloxane partial condensation product prepolymer having a viscosity equivalent to that of about 30 to 300 centipoises at 60% solids at 25° C. in ethanol; and
(B) Separating the resultant prepolymer from Step A from the reaction mixture to obtain a solvent-soluble further curable organopolysiloxane.

The present invention also provides a method of hydrolyzing an organic trialkoxysilane monomer as above described and preparing a thermoset organopolysiloxane from the solvent-soluble, further curable prepolymer by curing the prepolymer at about 90° to 300° C. or higher for at least one minute up to 168 hours or more to provide a hard, clear, chemical resistant, thermoset organopolysiloxane.

As previously indicated, the preferred aluminum-containing hydrolysis catalysts are aluminum chelates or alkoxides, the preferred chelates being aluminum triacetylacetonate, and diisopropoxyaluminum monoacetylacetonate. The preferred alkoxides are aluminum ethoxide, aluminum propoxide and aluminum butoxide and more preferably aluminum isopropoxide. Other suitable catalysts are aluminum chelates or alkoxides that do not precipitate out during the reactions such as di-alkoxyaluminum monoacetylacetonate in which the alkoxy radical has from 1 to 4 carbon atoms and aluminum alkoxides in which the alkoxy radical has 1 to 6 carbon atoms. Generally, at least a trace amount of the aluminum chelate catalyst is necessary to obtain the controllable hydrolysis and, hence an amount in the neighborhood of as low as about 0.01 part per million to about 1 or 2 parts by weight of aluminum per million parts of silane and water can be used to obtain benefits of the present invention. Usually, about 10 to 200 or 250 parts per million of the aluminum content of the catalyst are used although the preferred range is about 20 to 100 parts per million. When the amount of catalyst becomes greater than about 250 parts per million based on the aluminum content of the catalyst, it generally is being used in excess of that needed which is costly. Also when too much is used, the catalyst may cause precipitation and/or enough of the aluminum atoms will enter the polymer structure to affect adversely the properties of the polymer obtained.

In the case of the aluminum alkoxides, these must be mixed and reacted with the silane prior to mixing with water. If the alkoxides are mixed with water even at the same time the silane monomer is added, there is an undesirable reaction of the alkoxide with water and there is little or no alkoxide material to catalyze the hydrolysis.

The aluminum chelates useful in the present invention are compounds composed of a chelate (chelate-forming) structure which contains at least two donor groups so located with respect to one another that they are capable of forming a chelate ring (normally of 5 or 6 members) with an aluminum atom. The donor groups are well known and recognized by those skilled in the art of chelate chemistry. See, for example, the following literature references concerning chelate chemistry and lists of principal donor groups: "The Chelate Rings," by H. Diehl; "Chemical Reviews" 21, 39–111 (1937); and "Chemistry of the Metal Chelate Compounds," by Martell and Calvin, published in 1952 by Prentice-Hall, Inc., New York, N.Y. (1952). It might here also be mentioned that, in chelate-chemistry language, organic compounds containing the aforementioned chelating structures are often designated as "ligands"; and organic compounds having at least two ligand functions (i.e., at least two chelating structures) are often termed "polyligands." The aforementioned donor groups, and hence the chelate-forming structures or ligands therefrom, contain many different donor atoms among which may be mentioned by way of example oxygen, sulfur and nitrogen atoms. Optimum results in practicing the present invention have been obtained when the donor atom is an oxygen atom.

The aluminum atom in the aluminum chelate, according to the present invention, is trivalent.

A preferred chelating agent is a ketone according to the following general formula:

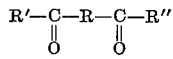

Illustrative examples of divalent radicals having from 1 to 3 carbon atoms, inclusive, that are represented by R in the above formula are divalent aliphatic hydrocarbon radicals having from 1 to 3 carbon atoms, e.g., alkylenes such as methylene, ethylene, propylene and isopropylene; and alkenylenes such as ethenylene, propenylene and isopropenylene.

As to R′ and R″ in the formula, examples of these radicals are monovalent hydrocarbon, halohydrocarbon, oxyhydrocarbon and thiohydrocarbon radicals containing from 1 to 12 carbon atoms, inclusive. More specific examples of such radicals are aliphatic (including cycloaliphatic), aromatic-substituted aliphatic, aromatic, and aliphatic-substituted aromatic hydrocarbon radicals having from 1 through 12 carbon atoms such as alkyl, e.g., methyl, ethyl and propyl through dodecyl (both normal and isomeric forms), cyclopentyl, cyclohexyl, cycloheptyl, etc.; alkenyl, e.g., vinyl, ethenyl, propenyl and other alkenyl radicals corresponding to the aforementioned alkyl radicals; aralkyl, e.g., benzyl, phenylethyl, phenylpropyl, etc.; aryl, e.g., phenyl, biphenylyl, naphthyl, etc.; alkaryl, e.g., tolyl, xylyl, diethylphenyl, dipropylphenyl, butyl-phenyl, etc.; the corresponding chlorinated, brominated and fluorinated derivatives (mono- through perhalogenated in the linear chain and/or in the aromatic nucleus); and the corresponding oxy and thio derivatives wherein one or more oxygen and/or sulfur atoms are positioned between carbon atoms in a linear chain and/or an aromatic ring. For instance, R′ and/or R″ in the above formula may be alkoxyalkyl (e.g., methoxymethyl, -ethyl, -propyl, -butyl, -pentyl and -hexyl) or the corresponding thio derivatives; the methoxy- through pentoxyphenyls or the corresponding thio derivatives; or heterocyclic compounds containing one or more oxygen or sulfur atoms in the ring, e.g., thienyl, furyl and the like.

When the chelating agent employed is a ketone as embraced in the above formula, in certain cases one may use advantageously ketones boiling below 300° C. at 760 mm. pressure.

The chelating agents employed in the preparation of the aluminum acetylacetonates and other aluminum chelates are those which are most readily available at minimum cost. Examples of classes of such chelating agents are the 1,3-diketones of which the diketones embraced by the above formula are a preferred sub-class, the β-ketoesters and the aromatic o-hydroxyaldehydes and esters. More specific examples of such chelating agents including those of the above-described formula are acetylacetone (2,4-pentanedione), benzoylacetone (1,phenyl - 1,3 - butanedione), dibenzoylmethane (1,3,diphenylpropanedione), 2-thenoylacetone, 2-furoylacetone, thenoyltrifluoroacetone, trifluoroacetylacetone, propionylacetone, butyrylacetone, 3-methyl-2,4-pentanedione, and 3-ethyl-2,4-pentanedione.

In addition, β-ketoesters such as ethylacetoacetate, methylacetoacetate and propylacetoacetate are suitable as aluminum chelate hydrolysis catalysts in the present invention.

Specific aluminum chelates which provide good results are aluminum di-sec-butoxide monoethyl acetonate, aluminum triethylacetoacetate, and aluminum trisalicylate.

A specific aluminum alkoxide that provides good results is aluminum trioctyloxide. In general, suitable alkoxides are aluminum alkoxides of the general formula Al(OR)$_3$ where R is an aliphatic hydrocarbon radical containing from 1 to 16 carbon atoms or an aromatic hydrocarbon radical containing from 6 to 14 carbon atoms or an alkyl aromatic or aryl radical such as phenyl, tolyl or naphthyl containing from 6 to 24 carbon atoms. The preferred alkoxides are isopropoxide and sec-butoxide.

Suitable trifunctional silane starting materials to provide the precured, further curable polymers and the cured or thermoset polymers are methyltrialkoxysilanes or mixtures of methyltrialkoxysilanes and phenyltrialkoxysilanes in which the alkoxy group has 1 to 6 carbon atoms and prefarably 2 to 3 carbon atoms.

Highly preferred trifunctional materials are methyltrialkoxysilane or a mixture thereof with phenyltrialkoxysilane in which the alkoxy group is preferably ethoxy. It it preferred that the molar ratio of methyltrialkoxysilanes to phenyltrialkoxysilanes in a mixture of the two is about 2:1 for general molding, and coating applications although generally good results can be obtained using a ratio of about 1.5:1 to 2.5:1. A polymer for laminates in particular and also coatings and even flexible coatings can be made with molar ratios of preferably about 1:1.0 to 1:6.0 and more preferably about 1:4.

For flexible coating applications, the liquid prepolymers can be dissolved in a solvent, cast and cured in place to provide outstanding coatings. However, for other applications, particularly laminating, it is preferred that the prepolymers be further condensed by heating prior to use.

In general, prepolymers to be condensed and thereafter spray dried or dried in a wiped film evaporator or otherwise converted to solvent-soluble liquids or solids that are free from gel and, in the case of solids, that are tack free at room temperature are prepared by:

(I) Heating at a pH of 7 a mixture of—

(A) a silane that is methyltrialkoxysilane phenyltrialkoxysilane, or mixtures of methyltrialkoxysilane and phenyltrialkoxysilane in which the alkoxy radical contains from 1 to 6 carbon atoms and preferably 2 to 3 carbon atoms; and (B) at least a trace of an aluminum chelate or alkoxide catalyst and at least about 1.5 moles of water for every mole of total silane present, at a temperature preferably of about 65° to 85° C. for a period of time of from about 1 to about 10 hours; and (II) Concentrating the liquid siloxane partial condensation product from Step I to remove some but not all volatile material including alkanol by-product and some water and to obtain a liquid residue having a viscosity equivalent to that of preferably about 30 to 65 centipoises at 60% solids at 25° C. in ethanol.

Thereafter the prepolymer product of Step II is precured at a temperature of from about slightly below, say 5° C., to as much as about 50° C. below the gel point of the resin for a period of time of from about 10 seconds to about 60 minutes, the 60 minutes requiring the lower temperatures. As previously indicated, the precuring can be accomplished in an economical and quite reproducible manner in a wiped film evaporator by forming a liquid film of the prepolymer product of Step II and heating the same at about 90° to 180° C.

As used here, the gel point is that temperature at which a 50 gram sample of prepolymer gels when placed in a 100 ml. beaker and stirred on a 600° F. (approximately 315° C.) hot plate.

The mixture of methyl and phenyl precured polymers is preferably made by (I) Heating a mixture of
(A) from about 1 to about 2 moles of methyltriethoxysilane and from about 6 to about 1 mole of phenyltriethoxysilane;
(B) from about 1.5 to about 3 or 4 moles of water for every mole of total silane present, there being at least a trace of and preferably at least about 20 parts by weight of aluminum in the form of aluminum chelate or alkoxide catalyst present in the reaction mixture per million parts of water and silane, at a temperature of about 80° C. for a period of time of from about 2 to about 6 hours; and thereafter, the mixture is further processed by (II) Concentrating the liquid siloxane partial condensation product from Step I by distilling at the reaction temperature until approximately 60-70% of the theoretical yield of ethanol is removed, thereby to remove some but not all volatile material including alkanol by-product and some water and to obtain a liquid residue that in the case of a methylsilane:phenylsilane ratio of about 2.5:1 to 1.5:1 has a viscosity of about 30 to 60 or 65 centipoises at 60% solids and 25° C. in ethanol or in the case of a methyl:phenyl ratio of about 1:3.5 to 1:4.5 has a viscosity of about 150 to 310 centipoises; and (III) Precuring or further condensing the prepolymer product of Step II preferably by forming a thin film thereof by heating the film to a temperature of about 140° to 190° C. which is a temperature of from about slightly below the gel point to about 30° C. below the gel point of the resin and holding this temperature for a period of time of from about 5 to 10 up to about 120 seconds.

Step III above can be accomplished by a heating of the liquid film of a prepolymer having a predetermined gel point of about 175° to 210° C. at about 170° to about 190° or 195°.

The precured polymer from the methyltrialkoxysilane is generally prepared by a method that includes the steps of (I) Heating at a pH of 7 a mixture of—
(A) a methyltrialkoxysilane wherein the alkoxy radical contains less than 4 carbon atoms and from 0 to 5 mole percent, based on total silane reactant material, of at least one compound represented by the general formula

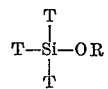

wherein R in the alkoxy radical —OR represents an alkyl radical having less than 4 carbon atoms such as methyl, ethyl and isopropyl, and each T independently represents an aryl, alkyl or alkenyl radical, each of which contains less than 7 carbon atoms, or the aforementioned alkoxy radical, —OR and (B) from 1.5 to about 10 moles and preferably from 2 to about 4 moles of water per mole of total silane and water reactant material, said mixture containing by weight from about 10 to 200 parts of aluminum in the form of aluminum chelate or alkoxide catalyst, per million parts of total silane and water, the heating of the said mixture to form a liquid siloxane partial condensation product being continued for from 1 to 10 hours at temperatures of at least 50° C. while retaining in said mixture at least 1.5 moles of alkanol by-product per mole of silane starting material assuming complete hydrolysis of all alkoxy-silicon linkages in the liquid reaction mixture;

(II) Concentrating the liquid siloxane partial condensation product from Step I by gradually raising its temperature above its initial reaction temperature to a maximum temperature within the range of from about 65° to 300° C. and preferably about 80° to 85° thereby to remove some but not all volatile material including alkanol by-product and some water and to obtain a liquid residue having a viscosity equivalent to that of about 15 to 35 centipoises at 50% solids at 25° C. in ethanol (which is about 21 to 41 centipoises at 60% solids at 25° C. in ethanol); and (III) Precuring the concentrated liquid siloxane partial condensation prepolymer product from Step II by heating the product preferably in the form of a liquid film at a temperature of about 140° to 180° C. which is generally slightly below its gelation point to remove the remainder of the volatile material and to obtain, without gelation, a more highly condensed, organic solvent-soluble, siloxane partial condensation precured polymer product that is capable of being finally cured to a solid organopolysiloxane resin. The precured resin, as previously indicated, when solid is also tack free at room temperature and is substantially free from gel. When the precured polymer is liquid, the prepolymer is generally heated from about 85° or 90° C. to about 180° C. preferably in the form of a thin film. The precured product is also free from gel and capable of forming consistently good flexible coatings.

In preparing a general purpose precured polymer from a mixture of methyl- and phenyltrialkoxysilanes, the liquid film is preferably one as described in Step II above that has been further heated to give a viscosity equivalent to that of about 50 to 65 centipoises and optimally, 55 to 60 centipoises, at 60% solids at 25° C. in ethanol, and the heating of the film is preferably conducted at about 160° to 180° C., optimally about 165 to 175° C.

Unless otherwise noted, the viscosity in centipoises used herein is that measured with an RVF Brookfield viscometer in accordance with ASTM 2196–63T, "Rheological Properties of Non-Newtonian Liquids."

The following examples are intended to illustrate the present invention and not to limit the same in any way.

EXAMPLE 1

An organopolysiloxane prepolymer was prepared from methyltriethoxysilane and phenyltriethoxysilane monomers, each of which were purified by distillation from aqueous saturated sodium carbonate solution to about zero parts by weight of HCl per million parts of silane (i.e., no acid) to provide substantially neutral conditions. The above-described mixture of methyl and phenyltriethoxysilane monomers was hydrolyzed with water and an aluminum chelate hydrolysis catalyst and condensed according to the formulation set forth below:

| Ingredients | Grams | Moles |
|---|---|---|
| Methyltriethoxysilane | 71.2 | 0.4 |
| Phenyltriethoxysilane | 48.0 | 0.2 |
| Water | 24.3 | 1.35 |
| Di-isopropoxyaluminum monoacetylacetonate | 0.1 | (1) |

[1] About 80 parts Al per million parts of silane plus water.

The aluminum chelate was prepared by the addition of one equivalent of acetylacetone to one equivalent of aluminum isopropoxide, followed by removal of the isopropanol by-product by distillation.

The above-identified reaction mixture was heated with agitation in a flask equipped with a condenser until the pot temperature reached 80° C. The reaction mixture became clear after one hour and was then refluxed for a total of four hours, to obtain an organopolysiloxane partial condensation product prepolymer. After the reflux period, water plus ethanol was distilled from the reaction mixture until the temperature reached 90° C.

A precured, further curable polymer having a viscosity equivalent to that of about 60 centipoises at 60% solids at 25° C. in ethanol was obtained with a gel temperature of 198° C. The precured, further curable polymer was mixed with enough n-butanol to provide a 40% by weight solids solution.

Coatings on aluminum and copper were prepared by dipping metal panels in this solution. On aluminum the coatings were heat cured at 220° C. for 7 minutes and on copper at 135° C. for 45 minutes and excellent hard clear coatings approximately 0.5 mil thick were obtained. The coatings survived 10% and 60% impact elongation tests, respectively.

An organopolysiloxane prepared from the same monomers but with an acid catalyst (10 p.p.m. HCl by weight) was tested for comparison. Coatings on copper survived only a 10% elongation and coatings on aluminum survived only a 5% elongation.

The above-mentioned impact elongation tests to determine the impact flexibility of the coatings were made with a G.E. impact flexibility tester. This instrument generally determines the relative flexibility of a paint, varnish or enamel film expressed as percentage elongation, in a range of 0.5 to 60% as based on the impact of a solid metal cylinder dropped through a guide track from a height of 4 feet onto the reverse side of a coated test panel. The end of the cylindrical impactor is studded with a group of spherical knobs varying in size and calibrated in terms of percent flexibility, based on the elongation or draw they can produce in a metal panel. A reading is made by observing the last indentation in ascending order to show no cracking of the coating.

EXAMPLE 2

A precured polymer was prepared as described in Example 1 except that aluminum triacetylacetonate was used in place of the di-isopropoxyaluminum monoacetylacetonate. The aluminum triacetylacetonate was prepared by the addition of three equivalents of acetylacetonate to one equivalent of aluminum isopropoxide, followed by the removal of the isopropanol by-product by distillation. Coatings were prepared according to the methods described in Example 1 and substantially similar results were obtained.

EXAMPLE 3

A prepolymer was prepared from the following formulation:

| Ingredients | Grams | Moles |
|---|---|---|
| Phenyltriethoxysilane | 120.0 | 0.5 |
| Methyltriethoxysilane | 178.3 | 1.0 |
| Water | 81 | 4.5 |
| Aluminum isopropoxide | 0.1 | (1) |

[1] 27 p.p.m. aluminum.

Methyltriethoxysilane and phenyltriethoxysilane were heated to about 50° C. and the aluminum isopropoxide then added; this dissolved after a few minutes and the water was then added. The mixture was then heated with stirring to 85°–90° C. and after about 10 minutes a clear homogeneous solution was obtained. The resultant solution was refluxed for 4 hours and ethanol and water was then distilled from the reaction mixture until the temperature reached 88° C., a total of 250 ml. distillate being removed.

One hundred (100) ml. of the liquid prepolymer was diluted to 250 ml. with n-butanol and the solution used to prepare coatings on aluminum and copper. On aluminum the coatings were heat cured at 220° C. for 7 minutes and on copper 135° C. for 45 minutes and excellent hard clear coatings approximately 0.5 mil thick were obtained. These coatings survived 5% and 20% impact elongation tests respectively.

The remainder of the liquid prepolymer was heated in an open beaker to 105° C. and the thick viscous further condensed liquid polymer poured into an aluminum weighing dish approximately 2 inches in diameter. This was then placed in an oven at 90° C. for 5 days. A hard transparent casting was obtained after this treatment.

EXAMPLE 4

An organopolysiloxane was made from the following formulation:

| Ingredients | Grams | Moles |
|---|---|---|
| Methyltriethoxysilane | 178 | 1.0 |
| Water | 40.5 | 2.25 |
| Aluminum triacetylacetonate | 0.05 | (1) |

[1] 20 p.p.m. aluminum.

The aluminum triacetylacetonate was prepared by the addition of three equivalents of acetylacetone to one equivalent of aluminum isopropoxide, followed by removal of the isopropanol by-product by distillation.

A precured polymer was prepared as described in Example 1. Coatings were prepared on aluminum and copper which were hard and clear and which survived 2% and 20% impact elongation tests respectively.

These were equivalent to coatings prepared from an organopolysiloxane from the same monomer using an acid catalyst (5 p.p.m. HCl by weight).

EXAMPLE 5

An organopolysiloxane was prepared according to the following formulation:

| Ingredients | Grams | Moles |
|---|---|---|
| Phenyltriethoxysilane | 240 | 1.0 |
| Methyltriethoxysilane | 44.6 | 0.25 |
| Water | 90 | 5.0 |
| Aluminum triacetylacetonate | 0.1 | (1) |

[1] Equivalent to 27 p.p.m. aluminum.

A liquid prepolymer was prepared as described in Example 1 which was then further heated in an open beaker to 170° C. This thick viscous further condensed polymer was then diluted with xylene until a solution with a viscosity of 12 cps. (centipoises) at 25° C. was obtained.

Style 181 E-glass cloth was dipped in this solution and air-dried for 2 hours. The cloth was then cut into squares 7" x 7"; these were stacked to give 14 plies and the stack placed in a press heated to 400° F. Slight pressure was applied until the resin gelled (20 minutes) and then 500 p.s.i. for 30 minutes at 400° F. The press was cooled to 200° F. and the laminate removed. A post-cure of 2 hours at each of the following temperatures (110° C., 150° C., 180° C., 205° C. and 230° C.) and finally 12 hours at 250° C. was given. The resin content of this laminate was 21% by weight; the flexural strength measured at room temperature was 38,900 p.s.i. and at 300° C. was 27,400 p.s.i. The tangent modulus at room temperature was $3.29 \times 10^6$ p.s.i. and at 300° C. was $3.03 \times 10^6$ p.s.i.

EXAMPLE 6

The hydrolysis and condensation reactions of Example 1 were attempted by using water alone (no catalyst) and also by using water plus acetylacetone. The reaction mixtures did not form clear solutions over a period of 6 hours at 85° C. and hence the reactions were undesirable without the aluminum chelate catalyst.

EXAMPLE 7

Aluminum tri-octyloxide having the formula $$Al(OC_8H_{17})_3$$

was prepared by the addition of a slight excess of n-octyl alcohol to aluminum tri-sec-butoxide followed by removal of sec-butyl alcohol by distillation according to the equation:

$$Al(OC_4H_9)_3 + 3C_8H_{17}OH \rightarrow Al(OC_8H_{17})_3 + 3C_4H_9OH$$

The resultant aluminum tri-octyloxide was used in place of the di-isopropoxyaluminum mono-acetoacetonate of Example 1 to prepare an organopolysiloxane according to the method described in Example 1. Substantially equivalent results were obtained.

EXAMPLE 8

Aluminum di-sec-butoxide mono-ethylacetonate which is an example of an aluminum di-alkoxy mono-chelate, was prepared by the addition of one equivalent weight of ethylacetoacetate to one equivalent weight of aluminum tri-sec-butoxide and removing the sec-butanol by distillation:

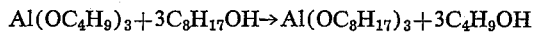

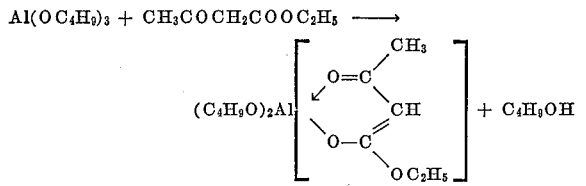

The above-described aluminum di-sec-butoxide mono-ethylacetonate was used in place of the aluminum chelate hydrolysis catalyst of Example 1 and substantially equivalent results were obtained.

EXAMPLE 9

Aluminum tri-ethylacetoacetonate, which is an aluminum tri-β-ketoester, was prepared by the addition of three equivalent weights of ethylacetoacetate to one equivalent weight of aluminum sec-butoxide and removing the sec-butanol by distillation according to the equation:

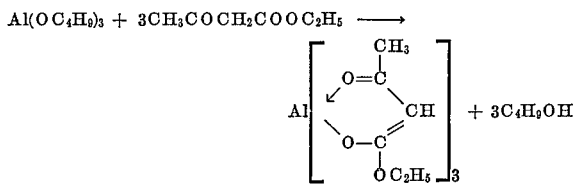

The above aluminum tri-β-ketoester was used in place of the aluminum chelate hydrolysis catalyst shown in the formulation of Example 1 and substantially equivalent results were obtained.

EXAMPLE 10

Aluminum tri-salicylate, an example of an aluminum tri-α-hydroxycarboxylic acid, was prepared by the addition of three equivalent weights of salicylic acid to one equivalent weight of aluminum tri-sec-butoxide and removing the sec-butanol by distillation according to the following equation:

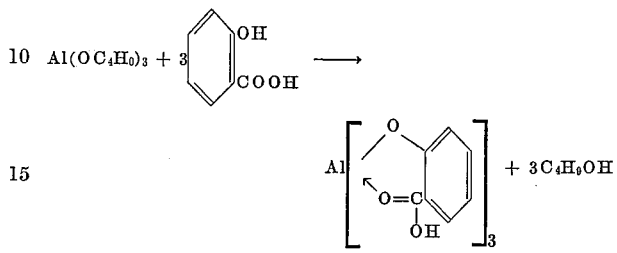

The above-described aluminum tri-salicylate was used in place of the aluminum chelate hydrolysis catalysts in Example 1 and substantially similar results were obtained.

In the above examples, other aluminum chelates and alkoxides such as tris(quinolin-8-oxy)aluminum, di-ethoxyaluminum monoacetylacetonate, di-methoxyaluminum monoacetylacetonate, dibutoxyaluminum monoacetylacetonate and aluminum tri-n-butoxide can be used as the hydroylsis catalyst to provide substantially similar results.

It is to be understood that various modifications of the invention herein described may be made without departing from the spirit and scope thereof.

What is claimed is:

1. A method of hydrolyzing an organic trialkoxysilane monomer and preparing a solvent-soluble further curable organopolysiloxane prepolymer therefrom, the method comprising the steps of:
   A. heating a mixture of
      (1) a silane which is selected from the group consisting of methyltrialkoxysilane, phenyltrialkoxysilane and mixtures thereof in which the alkoxy group contains 1 to 6 carbon atoms;
      (2) an effective catalytic amount of an aluminum-containing hydrolysis catalyst of the group consisting of aluminum alkoxide and aluminum chelate; and
      (3) at least about 1.5 moles of water for every mole of silane at a temperature of about 50° to 160° C. for about 1 to 10 hours to form an organopolysiloxane partial condensation product prepolymer having a viscosity equivalent to that of about 30 to 310 centipoises at 60% solids at 25° C. in ethanol, and
   B. separating from the reaction mixture the resultant prepolymer from Step A to obtain a solvent-soluble further curable organopolysiloxane.

2. A method of hydrolyzing an organic trialkoxysilane monomer and preparing a thermoset organopolysiloxane therefrom, the method comprising the steps of:
   A. heating a mixture of
      (1) a silane which is selected from the group consisting of methyltrialkoxysilane, phenyltrialkoxysilane and mixtures thereof in which the alkoxy group contains 1 to 6 carbon atoms;
      (2) an effective catalytic amount of an aluminum-containing hydrolysis catalyst of the group consisting of aluminum alkoxide and aluminum chelate; and
      (3) at least about 1.5 moles of water for every mole of silane at a temperature of about 50° to 160° C. for about 1 to 10 hours to form an organopolysiloxane partial condensation product prepolymer having a viscosity equivalent to that of about 30 to 310 centipoises at 60% solids at 25° C. in ethanol, and B. curing the product of Step A at about 90° to 300° C. for at least about one minute to provide a thermoset organopolysiloxane.

3. A method as defined in claim 1 in which the organopolysiloxane of Step B is mixed with an organic solvent therefor to obtain a solids content of about 20 to 60% by weight.

4. A method as defined in claim 3 in which the solution of claim 3 is applied to a surface to form a coating and the coating is cured at about 100 to 300° C. to form a hard flexible coating.

5. A method as defined in claim 1 in which the prodduct of Step B is further condensed at about 90° to 200° C. to provide an organic solvent-soluble, further curable organopolysiloxane.

6. A method as defined in claim 1 in which the silane is methyltriethoxysilane.

7. A method as defined in claim 1 in which the silane is a mixture of methyltriethoxysilane and phenyltriethoxysilane.

8. A method as defined in claim 1 in which the hydrolysis catalyst is used in an amount of about 10 to 200 parts by weight of aluminum per million parts by weight of silane and water.

9. A method as defined in claim 1 in which the hydrolysis catalyst is used in an amount of about 20 to 100 parts by weight of aluminum per million parts of silane and water.

10. A method as defined in claim 1 in which the hydrolysis catalyst is an aluminum chelate.

11. A method as defined in claim 1 in which the catalyst is aluminum alkoxide.

12. A method as defined in claim 1 in which the hydrolysis catalyst is di-alkoxyaluminum monoacetylacetonate where the alkoxy radical has 1 to 4 carbon atoms.

13. A method as defined in claim 1 in which the hydrolysis catalyst is di-isopropoxyaluminum monoacetylacetonate.

14. A method as defined in claim 1 in which the hydrolysis catalyst is aluminum triacetylacetonate.

15. A method as defined in claim 1 in which the hydrolysis catalyst is aluminum isopropoxide.

16. A method as defined in claim 1 in which the hydrolysis catalyst is tri(quinolin-8-oxy)aluminum.

17. A method as defined in claim 1 in which the heating of step A is at about 80° C. for about 4 hours.

18. A method as defined in claim 2 in which the prepolymer of Step B is cured at about 90° C.

19. A method as defined in claim 3 in which the organic solvent is n-butanol.

20. A method as defined in claim 3 in which the organic solvent is xylene.

21. A method as defined in claim 1 in which the silane is phenyltriethoxysilane.

22. A method as defined in claim 1 in which the alkoxide of the aluminum alkoxide has 1 to 6 carbon atoms and the aluminum chelate is aluminum dialkoxymonoacetonate in which the alkoxy group has from 1 to 4 carbon atoms.

References Cited

UNITED STATES PATENTS 3,367,910   2/1968   Newing _____ 260—46.5

DONALD E. CZAJA, Primary Examiner

M. I. MARQUIS, Assistant Examiner

U.S. Cl. X.R.

117—161, 135.1; 161—93, 193; 260—46.5, 448.2, 448.8